United States Patent
Seo et al.

(10) Patent No.: US 10,009,786 B2
(45) Date of Patent: Jun. 26, 2018

(54) METHOD FOR MEASURING DISTANCE BETWEEN TERMINALS ON BASIS OF DEVICE-TO-DEVICE DIRECT COMMUNICATION IN WIRELESS COMMUNICATION SYSTEM, AND DEVICE FOR SAME

(71) Applicant: LG ELECTRONICS INC., Seoul (KR)

(72) Inventors: Hanbyul Seo, Seoul (KR); Byounghoon Kim, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days. days.

(21) Appl. No.: 14/909,672

(22) PCT Filed: Aug. 28, 2014

(86) PCT No.: PCT/KR2014/008008
§ 371 (c)(1),
(2) Date: Feb. 2, 2016

(87) PCT Pub. No.: WO2015/030494
PCT Pub. Date: Mar. 5, 2015

(65) Prior Publication Data
US 2016/0183115 A1  Jun. 23, 2016

Related U.S. Application Data

(60) Provisional application No. 61/871,867, filed on Aug. 29, 2013.

(51) Int. Cl.
*H04W 4/00* (2018.01)
*G01R 31/08* (2006.01)
(Continued)

(52) U.S. Cl.
CPC .......... *H04W 24/10* (2013.01); *G01S 5/021* (2013.01); *G01S 5/14* (2013.01); *G01S 11/02* (2013.01);
(Continued)

(58) Field of Classification Search
CPC .......... G01S 5/021; G01S 5/14; G01S 11/02; H04W 4/005; H04W 8/005; H04W 24/10; H04W 64/00; H04W 88/02
(Continued)

(56) References Cited

U.S. PATENT DOCUMENTS 6,603,800 B1 * 8/2003 Mesecher ............... G01S 5/12
375/145
2002/0102989 A1 * 8/2002 Calvert ............... H04W 64/00
455/456.5
(Continued)

FOREIGN PATENT DOCUMENTS

CN      1329402 A    1/2002
CN      1954556 A    4/2007
(Continued)

*Primary Examiner* — German J Viana Di Prisco
*Assistant Examiner* — Mark G. Pannell
(74) *Attorney, Agent, or Firm* — Birch, Stewart, Kolasch & Birch, LLP

(57) ABSTRACT

A method is provided for calculating a distance to a counterpart user equipment (UE) using device-to-device (D2D) communication, which is calculated by a UE in a wireless communication system. The UE receives a synchronization signal from a cluster head and receives a first discovery signal from the counterpart UE, and calculates a first difference value between a time of receiving the first discovery signal and a time of receiving the synchronization signal. The UE further receives, from the counterpart UE, information on a second difference value and calculates a first sum value of the first difference value and the second difference value. The UE receives, from the cluster head, information
(Continued)

on a second sum value. The UE calculates a distance between the UE and the counterpart UE based on a difference between the second sum value and the first sum value.

8 Claims, 7 Drawing Sheets

(51) Int. Cl.
*G06F 11/00* (2006.01)
*G08C 15/00* (2006.01)
*H04J 1/16* (2006.01)
*H04J 3/14* (2006.01)
*H04L 1/00* (2006.01)
*H04B 1/00* (2006.01)
*H04W 24/00* (2009.01)
*H04W 24/10* (2009.01)
*G01S 11/02* (2010.01)
*H04W 88/02* (2009.01)
*H04W 8/00* (2009.01)
*H04W 64/00* (2009.01)
*G01S 5/02* (2010.01)
*G01S 5/14* (2006.01)

(52) U.S. Cl.
CPC ............ *H04W 4/005* (2013.01); *H04W 8/005* (2013.01); *H04W 64/00* (2013.01); *H04W 88/02* (2013.01)

(58) Field of Classification Search
USPC ........................................ 455/422.1
See application file for complete search history.

(56) References Cited

U.S. PATENT DOCUMENTS

| | | | |
|---|---|---|---|
| 2008/0146262 A1* | 6/2008 | Schwoerer | G01S 5/0215 455/500 |
| 2008/0274753 A1* | 11/2008 | Attar | G01S 5/0205 455/456.6 |
| 2009/0268665 A1* | 10/2009 | Yousef | H04W 64/00 370/328 |
| 2011/0007650 A1 | 1/2011 | Nam et al. | |
| 2011/0141909 A1 | 6/2011 | Hibara et al. | |
| 2011/0292820 A1* | 12/2011 | Ekbal | G01S 13/765 370/252 |
| 2012/0087272 A1* | 4/2012 | Lemkin | G01S 5/0289 370/252 |
| 2013/0045759 A1* | 2/2013 | Smith | H04W 64/00 455/456.6 |
| 2013/0316727 A1* | 11/2013 | Edge | H04W 4/02 455/456.1 |
| 2014/0064203 A1 | 3/2014 | Seo et al. | |
| 2015/0270931 A1* | 9/2015 | Sun | H04L 1/0072 370/329 |
| 2016/0165559 A1* | 6/2016 | Nagata | H04W 56/002 370/350 |

FOREIGN PATENT DOCUMENTS

| | | |
|---|---|---|
| CN | 102595314 A | 7/2012 |
| CN | 102823311 A | 12/2012 |
| EP | 1 758 308 A1 | 2/2007 |
| KR | 10-0808941 B1 | 3/2008 |
| KR | 10-0974044 B1 | 8/2010 |
| WO | WO 2012/128505 A2 | 9/2012 |

* cited by examiner

FIG. 2
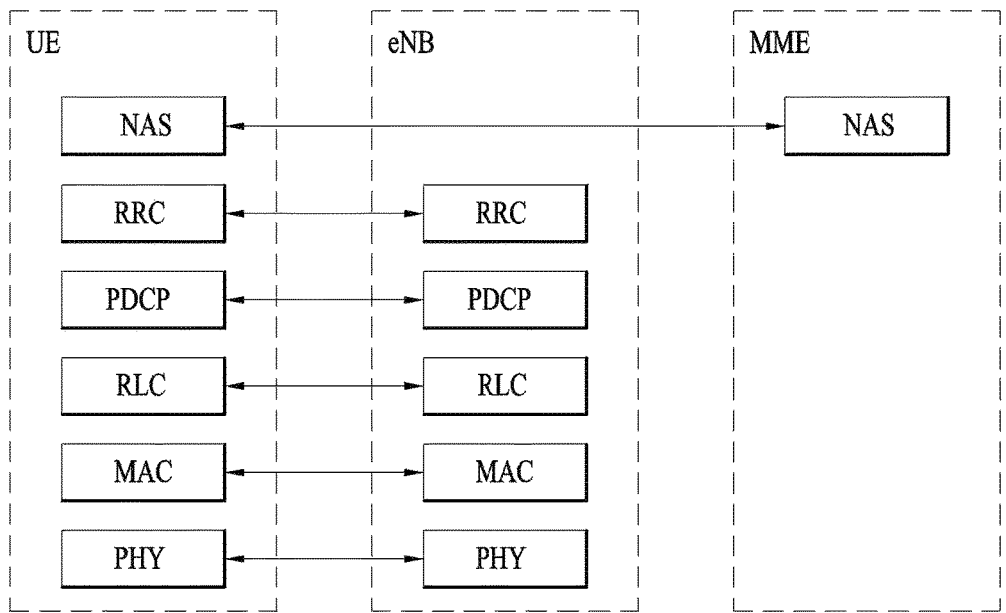
(A) CONTROL-PLANE PROTOCOL STACK
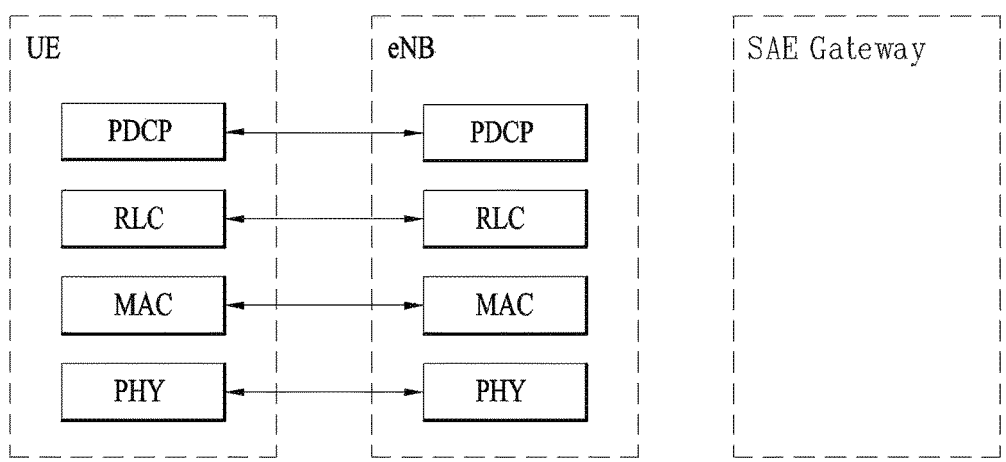
(B) USER-PLANE PROTOCOL STACK

METHOD FOR MEASURING DISTANCE BETWEEN TERMINALS ON BASIS OF DEVICE-TO-DEVICE DIRECT COMMUNICATION IN WIRELESS COMMUNICATION SYSTEM, AND DEVICE FOR SAME

CROSS REFERENCE TO RELATED APPLICATIONS

This application is the National Phase of PCT International Application No. PCT/KR2014/008008, filed on Aug. 28, 2014, which claims priority under 35 U.S.C. 119(e) to U.S. Provisional Application No. 61/871,867, filed on Aug. 29, 2013, all of which are hereby expressly incorporated by reference into the present application.

TECHNICAL FIELD

The present invention relates to a wireless communication system, and more particularly, to a method of measuring a distance between terminals based on D2D (device-to-device) direct communication in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per hit, service availability increase, flexible frequency band use, simple structure/open interface and reasonable power consumption of user equipment and the like are required for the future competitiveness.

DISCLOSURE OF THE INVENTION

Technical Task

A technical task of the present invention is to provide a method of measuring a distance between terminals based on D2D (device-to-device) direct communication in a wireless communication system and an apparatus therefor based on the aforementioned discussion.

Technical Solution

To achieve these and other advantages and in accordance with the purpose of the present invention, as embodied and broadly described, according to one embodiment, a method of calculating a distance to a counterpart user equipment (UE) using device-to-device (D2D) communication, which is calculated by a UE in a wireless communication system, includes the steps of receiving, by the UE, a synchronization signal from a cluster head and receiving a first discovery signal from the counterpart UE, calculating, by the UE, a first difference value between a time of receiving the first discovery signal and a time of receiving the synchronization signal, receiving, by the UE from the counterpart UE, information on a second difference value between a time of receiving a second discovery signal, which is transmitted by the UE, received by the counterpart UE and a time of receiving the synchronization signal received by the counterpart UE, calculating, by the UE, a first sum value of the first difference value and the second difference value, receiving, by the UE from the cluster head, information on a second sum value of a third difference value between a time of receiving the first discovery signal by the cluster head and a time of transmitting the synchronization signal by the cluster head and a forth difference value between a time of receiving the second discovery signal by the cluster head and a time of transmitting the synchronization signal by the cluster head, and calculating, by the UE, a distance between the UE and the counterpart UE based on a difference between the second sum and the first sum value.

In this case, the method can further include the step of transmitting, by the UE to the counterpart UE, the information on the first difference value. The method can further include the step of transmitting, by the UE to the counterpart UE, the second discovery signal when a prescribed time unit elapses after the synchronization signal is received from a cluster head.

Preferably, the first discovery signal can be transmitted by the counterpart UE when a prescribed time unit elapses after the counterpart UE receives the synchronization signal from the cluster head.

To further achieve these and other advantages and in accordance with the purpose of the present invention, according to a different embodiment, a UE performing D2D communication in a wireless communication system includes a Radio Frequency (RF) module configured to transceive a signal with a counterpart UE of the D2D communication and a processor configured to process the signal. The processor is further configured to control the RF module to receive a synchronization signal from a cluster head and receive a first discovery signal from the counterpart UE, calculate a first difference value between a time of receiving the first discovery signal and a time of receiving the synchronization signal, control the RF module to receive information on a second difference value between a time of receiving a second discovery signal, which is transmitted by the UE, received by the counterpart UE and a time of receiving the synchronization signal received by the counterpart UE, calculate a first sum value of the first difference value and the second difference value, control the RF module to receive, from the cluster head, information on a second sum value of a third difference value between a time of receiving the first discovery signal by the cluster head and a time of transmitting the synchronization signal by the cluster head and a forth difference value between a time of receiving the second discovery signal by the cluster head and a time of transmitting the synchronization signal by the cluster head, and calculate a distance between the UE and the counterpart UE based on a difference between the second sum and the first sum value.

In this case, the processor can control the RF module to transmit the information on the first difference value to the counterpart UE. The processor can control the RF module to transmit, to the counterpart UE, the second discovery signal when a prescribed time unit elapses after the synchronization signal is received from a cluster head.

Preferably, the first discovery signal can be transmitted by the counterpart UE when a prescribed time unit elapses after the counterpart UE receives the synchronization signal from the cluster head.

In the foregoing embodiments, the prescribed time unit can be represented by a subframe unit and may correspond to a predetermined value to the UE, the counterpart UE and the cluster head.

Advantageous Effects

According to embodiments of the present invention, it is able to efficiently measure a distance between terminals using D2D (device-to-device) direct communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard;

BEST MODE

Mode for Invention

Figure 1:
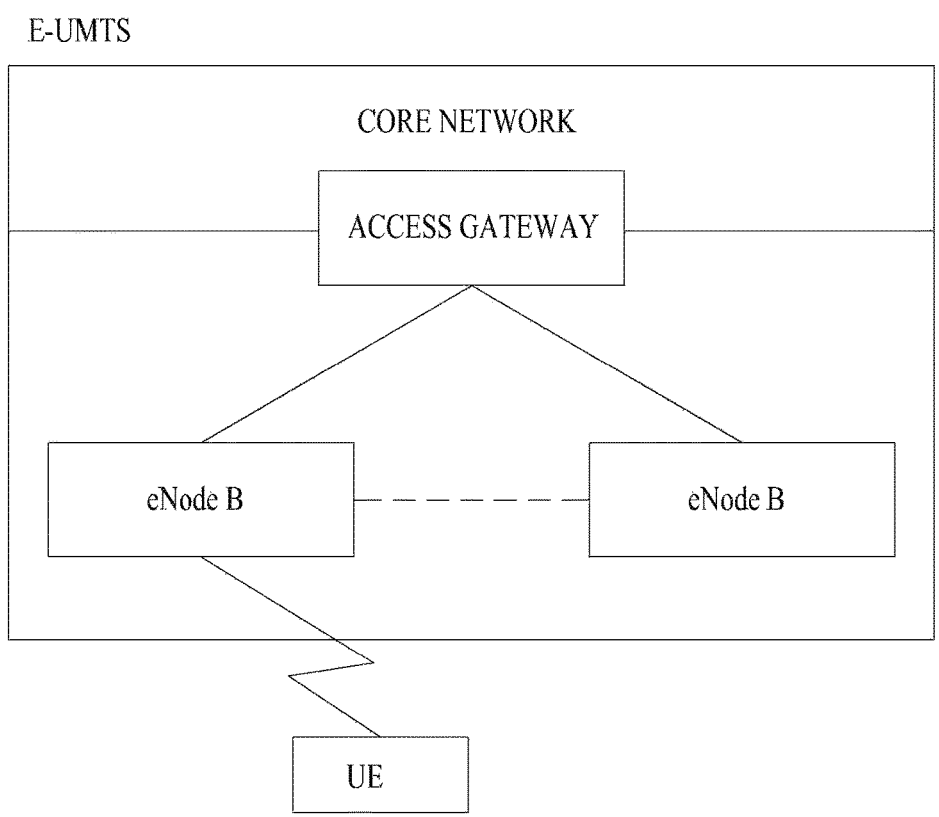
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MITCH (multicast traffic channel) and the like.

Figure 3:
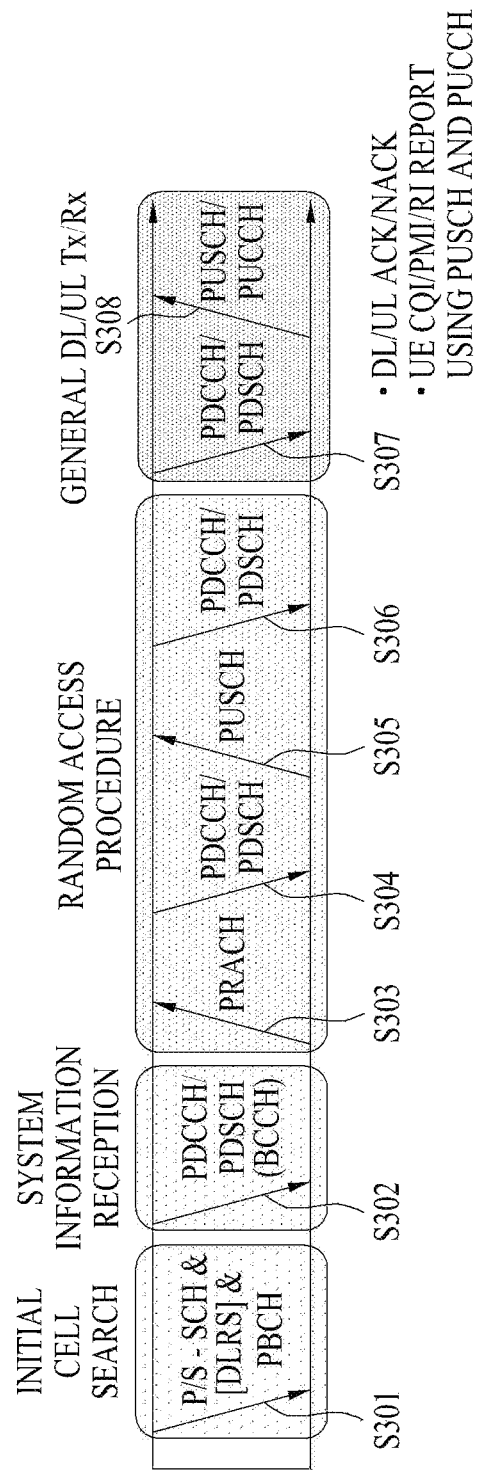
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301], To this end, the user equipment may receive a primary synchronization channel (P-SCH) and a secondary synchronization channel (S-SCH) from the eNode B, may be synchronized with the eNode and may then obtain information such as a cell and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
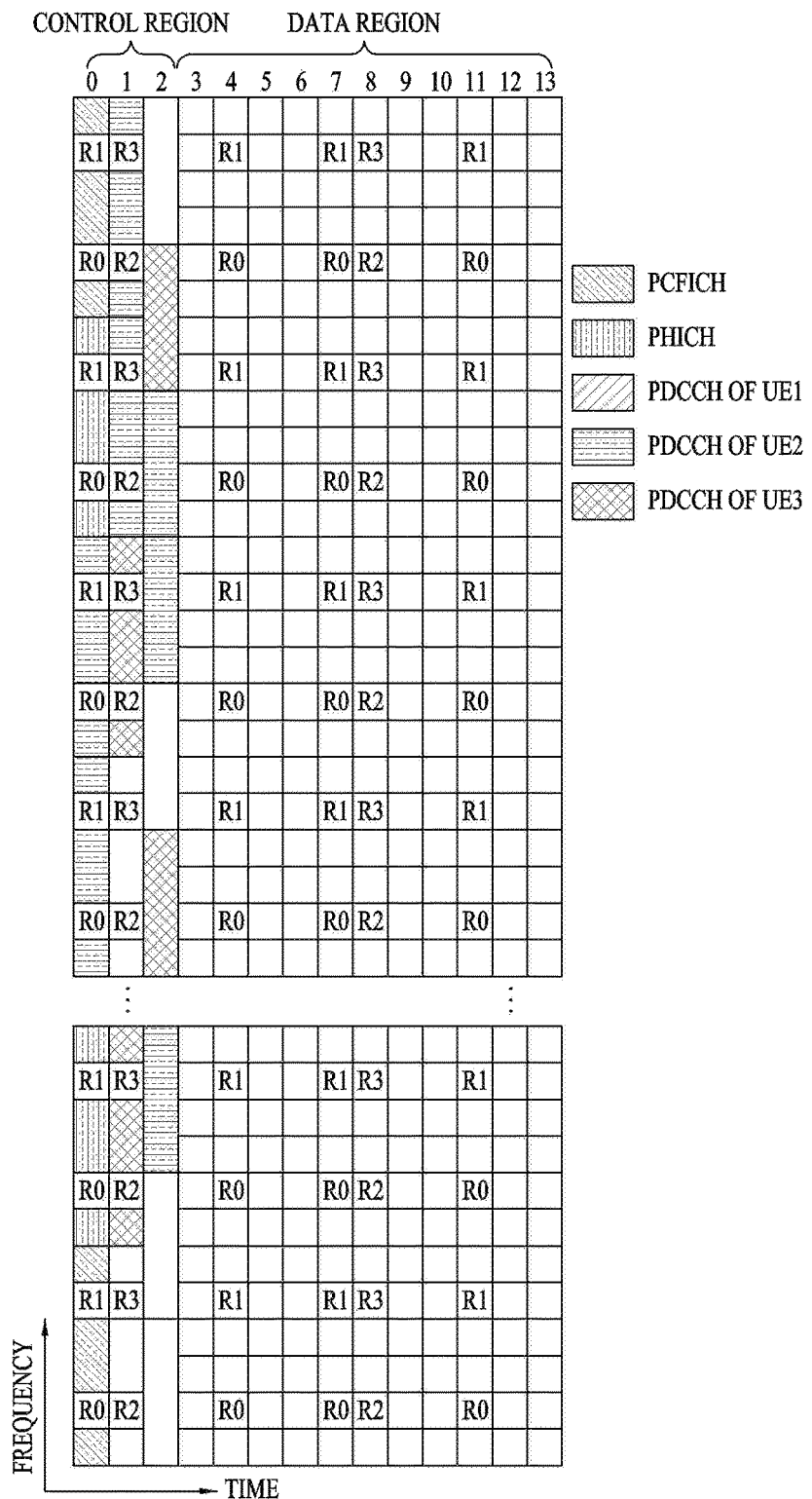
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
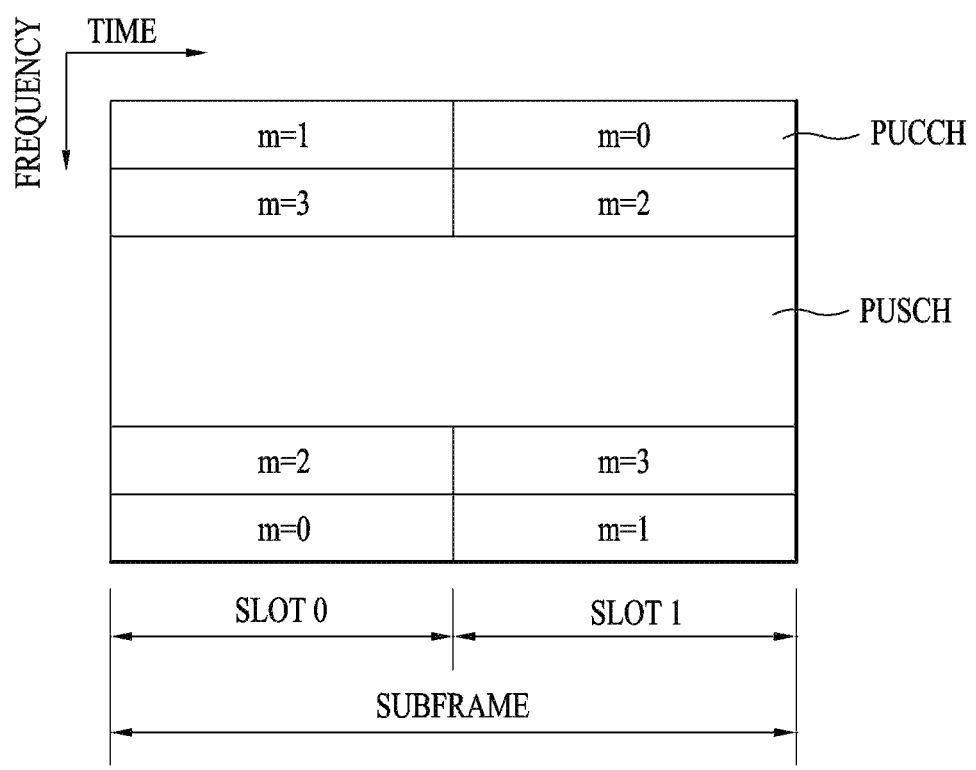
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates a structure of a UL subframe in the LTE system.

Referring to FIG. 5, a UL subframe may be divided into a control region and a data region. A Physical Uplink Control Channel (PUCCH) including Uplink Control information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
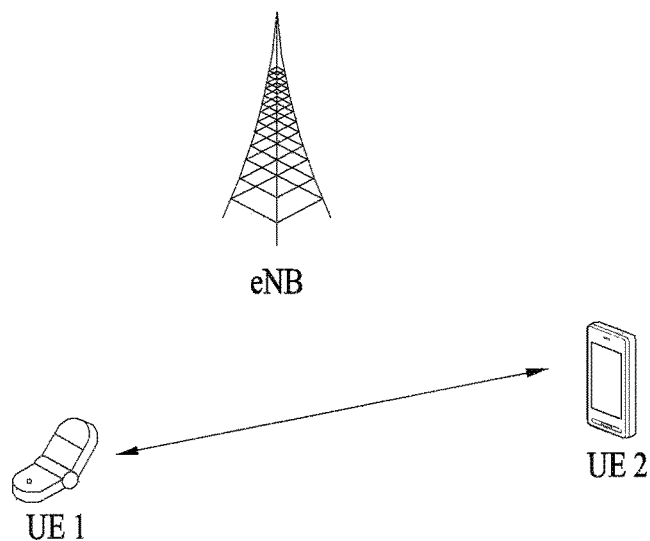
FIG. 6 is a diagram illustrating the concept of device-to-device (D2D) communication.

FIG. 6 shows the concept of D2D communication.

Referring to FIG. 6, a UE1 and a UE2 perform direct communication between the UE1 and the UE2 and a UE3 and a UE4 also perform direct communication between the UE3 and the UE4. An eNB can control a position of a time/frequency resource, transmit power and the like via an appropriate control signal for the direct communication between the UEs. Yet, if UEs exist at the outside of coverage of the eNB, direct communication between the UEs can be configured to be performed without a control signal of the eNB. In the following, direct communication between UEs is called D2D (device-to-device) communication.

The present invention proposes a method for a UE to measure a position of a counterpart UE or a distance to the counterpart UE using D2D communication shown in FIG. 6 is proposed.

If a UE is able to identify a position of a different UE or a distance to the different UE, it may be able to provide various useful services. For example, if it is able to identify a distance to a UE of a different user and the different user is positioned within a prescribed distance, it is able to provide a user with such a service for identifying the adjacent different user by informing the user of the aforementioned fact. As a different example, when a plurality of UEs transmit a message such as an advertisement, a user may enable an operation for configuring an advertisement message existing within a prescribed distance from a UE of the user to be received only. As a further different example, it is able to provide a user with a service for examining whether a UE, which is registered as an interested object to the user, exists within a prescribed area from the user, a distance from the user and the like and the service for informing the user of a result of the examination.

In a wireless communication system, a method for a UE to identify a location of the UE based on a signal received from an eNB has been proposed as a technology of identifying location information of a UE. According to the technology, a UE measures a signal (e.g., a PRS (positioning reference signal) of 3GPP LTE system) transmitted by an eNB and measures time of arrival of a signal transmitted by each eNB or a difference between times of arrival of signals transmitted by two eNBs to identify a location of the UE. More specifically, if a UE measures a difference between times of arrival of signals transmitted from two eNBs, the UE is able to identify a difference between distances from the two eNBs. The UE is able to know a fact that the UE is located at a point on a curve of which the difference between distances from the eNB is constant. If this procedure is also repeated for two different eNBs, it is able to obtain several curves at which the IX is able to locate and it is able to identify a location of the UE using a point at which the curves meet. In order to actually perform the aforementioned operation, it is necessary to have UE-measured location information of an eNB. Yet, since a network already knows a location of an eNB, if a UE reports time of arrival of a signal transmitted by an eNB or a difference between times of arrival of signals transmitted by two eNBs to the network, the network can identify a location of the UE.

As a different technology of identifying location information of a UE in a wireless communication system, a method for a network to identify a location of a UE based on a signal transmitted by the UE and received by an eNB has been proposed. According to the technology, the UE transmits a specific signal (e.g., 3GPP LTE SRS (sounding reference signal)) to a plurality of eNBs and a plurality of the eNBs receive the signal. In this case, time of arrival of the signal is measured at each of a plurality of the eNBs or a difference between times of arrival of the signal is measured at two eNBs. Subsequently, the network can calculate a distance between each eNB and the UE or a difference between distances to the UE from two eNBs based on location information of each eNB possessed by the network in advance. If this operation is repeated for a plurality of eNBs, it may be able to obtain a commonly appearing point. In this case, the commonly appearing point can be considered as a point at which the UE is located.

When a UE intends to identify a location of a specific different UE, the aforementioned legacy operations are inappropriate for being widely utilized. In particular, if a part of configurations of a network is damaged by disaster such as fire or earthquake, it is difficult to identify UE location information, which is implemented based on information of the network. Hence, it is necessary for UEs to identify mutual location information at the outside of coverage of the network while the UEs are communicating with each other.

Hence, the present invention proposes a method for UEs located at the outside of network coverage to identify mutual location information in a manner of performing D2D communication.

First of all, when D2D communication is performed, assume a case that a specific UE performs an operation of a cluster head. If the specific UE becomes the cluster head, the specific UE transmits a synchronization reference signal, which becomes a reference of synchronization, and UEs near the specific UE transmit/receive a D2D signal on the basis of the synchronization reference signal. In particular, each UE can transmit a signal indicating the existence of the UE (e.g., a signal including ID information of the UE) at specific timing, which is determined based on timing of receiving the synchronization reference signal.

A signal, which is transmitted to make a different HE identify the existence of a UE, is called a discovery signal. Specifically, if a specific UE i receives a synchronization reference signal at timing $x_i$, the specific UE i can transmit a discovery signal of the specific UE i at timing $(x_i+D_i)$ separated from the timing $x_i$ as much as a predetermined time interval $D_i$. In particular, a basic unit of the time interval $D_i$ may correspond to a length of a subframe or a length of an OFDM symbol and it may be able to restrict the time interval $D_i$ to be an integer multiple of the basic unit. As an example, if a length of a subframe corresponds to L, the time interval $D_i$ can be represented as D*L (where D is an integer). This indicates that a UE transmits a discovery signal of the LTE after time as much as D subframes elapses from the timing of receiving a synchronization reference signal.

Figure 7:
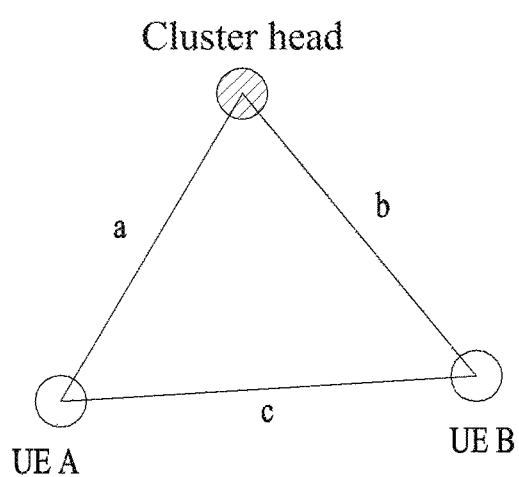
FIG. 7 is a diagram for an example for a UE A and a UE B to measure a mutual distance in a situation that a UE operating as a cluster head exists according to embodiments of the present invention.

FIG. 7 is a diagram for an example for a UE A and a UE B to measure a mutual distance in a situation that a UE operating as a cluster head exists according to embodiments of the present invention. In particular, in FIG. 7, propagation delay of a D2D signal between the cluster head and the UE A, propagation delay of a D2D signal between the cluster head and the UE B and propagation delay of a D2D signal between the UE A and the UE B are presented as a, b and c, respectively. If the propagation delay is measured and process speed of the D2D signal, i.e., speed of light, is multiplied by the propagation delay, it is able to estimate a distance between UEs.

Regarding this, it is explained in more detail with reference to FIG. 7 in the following. If the cluster head transmits a synchronization reference signal at the time of t, the UE A and the UE B receive the synchronization reference signal at the time of t+a and t+b, respectively. The UE A and the UE B transmit a discovery signal of its own at the time of $t+a+D_A$ and $t+b+D_B$, respectively. In this case, assume that the $D_A$ and the $D_B$ correspond to predetermined values or values capable of being identified by UEs in a manner of attempting to detect a discovery signal among prescribed candidate values.

Subsequently, the UE A receives a discovery signal of the UE B at the time of $t+b+D_B+c$ and the UE B receives a discovery signal of the UE A at the time of $t+a+D_A+c$. Each UE calculates a difference value in a manner of subtracting the timing of receiving a synchronization reference signal received from the cluster head from the timing of receiving a discovery signal of a counterpart UE as shown in Equation 1 in the following.

$$UEA:(t+b+D_B+c)-(t+a)=b+c-a+D_B$$

$$UEB:(t+a+D_A+c)-(t+b)=a+c-b+D_A \quad \text{[Equation 1]}$$

Lastly, the UE A and the UE B exchange a calculated value with each other and may be able to obtain c corresponding to propagation delay between the UE A and the UE B in a manner of adding the calculated values as shown in Equation 2 in the following.

$$(b+c-a+D_B)+(a+c-b+D_A)=2c+D_A+D_B \quad \text{[Equation 2]}$$

In this case, as mentioned in the foregoing description, if the $D_A$ and the $D_B$ correspond to values known in advance, it is able to obtain a value of c in a manner of subtracting the $D_A$ and the $D_B$ from the Equation 2. Or, it may be able to make a different UE identify the value of c in a manner that a UE informs the different UE of information on the time of receiving a discovery signal received by the UE.

As a different method, if the cluster head informs a different UE of information on the time of receiving discovery signals transmitted by the UE A and the UE B, it may be able to make each UE measure a mutual distance. In the aforementioned example, the cluster head receives discovery signals transmitted by the UE A and the UE B at the time of $t+2a+D_A$ and $t+2b+D_B$, respectively. In this case, since the cluster head identifies the $D_A$ and the $D_B$ according to the aforementioned scheme, the cluster head can identify a or b corresponding to propagation delay between UEs. If information on the propagation delay is known to each UE, each UE can calculate propagation delay c between two UEs in a manner of eliminating a and b from Equation 1. Or, the cluster head can inform each UE of a-b corresponding to a difference between timings of receiving discovery signals of two UEs. Having received the a-b, a UE can calculate propagation delay c between two UEs in a manner of excluding the a-b from Equation 1.

As a further different method, a distance between the UE and the UE B can be measured using time of arrival of a signal, which is arrived at the UE B from the UE A. The signal transmitted by the UE A at the time of $t+a+D_A$ arrives at the UE B at the time of $t+a+D_A+c$. The UE B transmits a signal including information on reception timing of the UE A to the UE A at specific timing corresponding to $t+b+D_B$. By doing so, it may be able to make the UE A help to calculate propagation delay c between the two UEs.

More specifically, the UE B can inform the UE A of a difference between the $t+b+D_B$ corresponding to timing of transmitting a signal to the UE A and the $t+a+D_A+c$ corresponding to timing of receiving a signal from the UE A. This can be formulated as Equation 3 shown in the following.

$$(t+b+D_B)-(t+a+D_A+c)=-a+b-c-D_A+D_B-z+n*T_u \quad \text{[Equation 3]}$$

In Equation 3, n corresponds to an integer, $T_u$ indicates unit time represented by a length of an OFDM symbol or a length of a subframe, and z has a value greater than 0 and smaller than the $T_u$. In particular, the z can be interpreted as modulo calculation is performed on $-a+b-c-D_A+D_B$ corresponding to a result of Equation 3 using the $T_u$.

In general, since propagation delay for a distance between two UEs capable of performing D2D is shorter than a length of an OFDM symbol, it may be able to consider that the z indicates unit time smaller than the aforementioned unit time in a difference between the timing of transmitting a signal transmitted by the UE B and the timing of receiving a signal received from the UE A. The UE B can inform the UE A of a difference between the timing of receiving a signal received from the UE A and the timing of transmitting a signal transmitted to the UE A. Among the difference, the UE B can inform the UE A of the z indicating a part smaller than the unit time only or $T_u-z$ including identical information.

Figure 8:
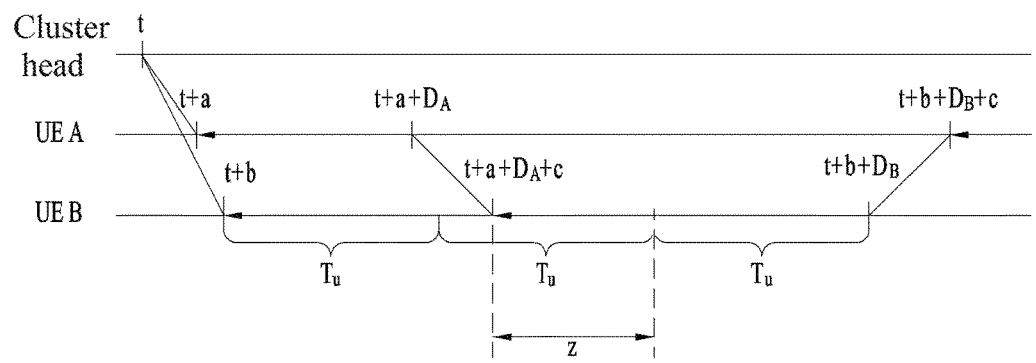
FIG. 8 is a diagram for an example of calculating a z value according to embodiment of the present invention.

FIG. 8 is a diagram for an example of calculating a z value according to embodiment of the present invention. In particular, FIG. 8 assumes a case that $D_A$ and $D_B$ correspond to $T_u$ and $3*T_u$, respectively.

Referring to FIG. 8, a UE A finally receives a signal of a UE B at the time of $t+b+D_B+c$. If a value delivered from the UE A, i.e., $-a+b-c-D_A+D_B$ of Equation 3, is subtracted at the time of receiving the signal, it is able to represent as Equation 4 described in the following.

$$(t+b+D_B+c)-(-a+b-c-D_A+D_B)=t+a+2c+D_A \quad [\text{Equation 4}]$$

In this case, since $t+a+D_A$ corresponds to a value already identified by the UE A as the timing of transmitting a signal to the UE B, it is able to calculate 2c.

Yet, if information on z is delivered only from the UE B, it is unable to know a value of c. Hence, many c values can be calculated. In this case, it may be able to select a smallest one from c values greater than 0. This is because propagation delay between two UEs is very smaller than T in general in a situation that D2D communication is available.

Meanwhile, if timings of UEs are not matched with each other, it may be difficult for one UE to precisely identify a transmission offset value $D_i$ of a discovery signal configured by another UE. In particular, due to an error of an oscillator used by each UE, a $D_i$ value configured by one UE can be appeared as a different value in terms of another UE.

In this case, first of all, a cluster head can calculate a difference between timing of receiving discovery signals received from a UE A and a UE B and timing of transmitting a synchronization reference signal transmitted by the cluster head as shown in Equation 5 in the following.

$$UEA: t+2a+D_A-t=2a+D_A$$

$$UEB: t+2b+D_B-t=2b+D_B \quad [\text{Equation 5}]$$

If the cluster head informs each UE of $2a+2b+D_A+D_B$ corresponding to a sum of two values calculated according to Equation 5, i.e., $2a+D_A$ and $2b+D_B$, and the UE A and the UE B subtract a value obtained by Equation 2 from the value informed by the cluster head, it may be able to obtain a result shown in Equation 6 in the following. Of course, it may also be able to inform both the UE A and the UE B of the two values $2a+D_A$ and $2b+D_B$ which are calculated according to Equation 5.

$$UEA \& UEB: (2a+2b+D_A+D_B)-(2c+D_A+D_B)=2a+2b-2c \quad [\text{Equation 6}]$$

If the operation is repeated for a case that each of the UE A and the UE B becomes a cluster head and transmits a synchronization reference signal, each UE is able to obtain $2a-2b+2c$ and $-2a+2b+2c$. Each UE is able to calculate a, b and c corresponding to propagation delay between the UEs in a manner of combining the values with each other.

Consequently, each UE is able to obtain information on a distance with another UE without a network device such as a base station or the like via the aforementioned discovery signal transmission and reception operation and a corresponding information exchange procedure.

Figure 9:
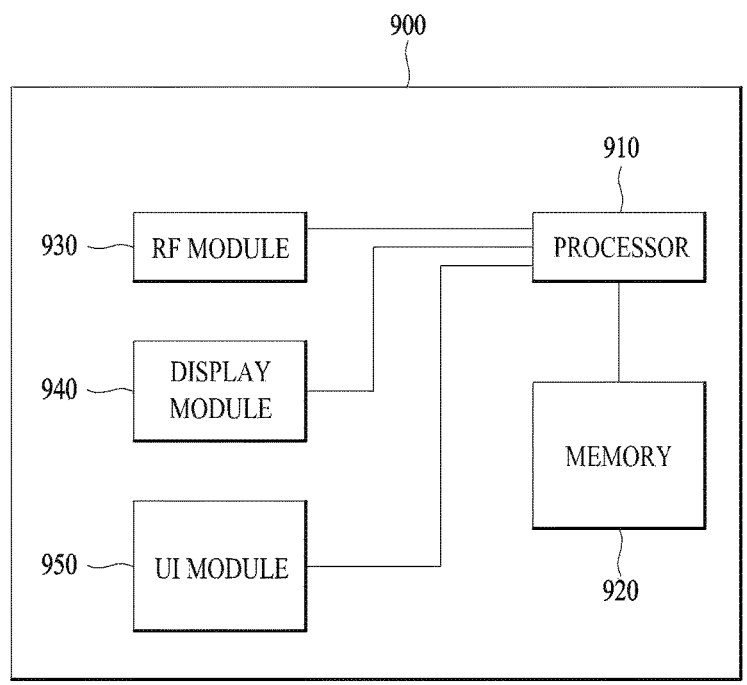
FIG. 9 is a block diagram of a communication apparatus according to an embodiment of the present invention.

FIG. 9 is a block diagram of a structure of a communication device 900 according to an embodiment of the present invention.

Referring to FIG. 9, the communication device 900 includes a processor 910, a memory 920, an RF module 930, a display module 940, and a user interface module 950.

The communication device 900 is illustrated for convenience of description and some modules may not be omitted. The communication device 900 may further include necessary modules, addition, some modules of the communication device 900 may be subdivided. The processor 910 is configured to perform operations according to the embodiment of the present invention that is exemplified with reference to the diagrams. In detail, a detailed operation of the processor 910 would be understood with reference to FIGS. 1 to 8.

The memory 920 is connected to the processor 910 and stores an operating system, an application, a program code, data, etc. The RF module 930 is connected to the processor 910 and converts a baseband signal into a radio signal or converts a radio signal into a baseband signal. To this end, the RF module 930 performs analog conversion, amplification, filtering, and frequency up-conversion, or inverse procedures thereof. The display module 940 is connected to the processor 910 and displays various pieces of information. The display module 940 may use, but is not limited to, well-known elements such as a liquid crystal display (LCD), a light emitting diode (LED), and an organic light emitting diode (OLED). The user interface module 950 may be connected to the processor 910 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of measuring a distance between UEs based on D2D communication in a wireless communication system and an apparatus therefor are described with reference to examples applied to 3GPP LTE system, it may be applicable to various kinds of wireless communication systems as well as the 3GPP LTE system.

What is claimed is:

1. A method of calculating a distance to a counterpart user equipment (UE) using device-to-device (D2D) communication, which is calculated by a UE in a wireless communication system, the method comprising:
receiving, by the UE, a synchronization signal from a cluster head and receiving a first discovery signal from the counterpart UE;
calculating, by the UE, a first difference value between a time of receiving the first discovery signal and a time of receiving the synchronization signal;
receiving, by the UE from the counterpart UE, information on a second difference value between a time of receiving a second discovery signal, which is transmitted by the UE, received by the counterpart UE and a time of receiving the synchronization signal received by the counterpart UE;
calculating, by the UE, a first sum value of the first difference value and the second difference value;
receiving, by the UE from the cluster head, information on a second sum value of a third difference value between a time of receiving the first discovery signal by the cluster head and a time of transmitting the synchronization signal by the cluster head and a forth difference value between a time of receiving the second discovery signal by the cluster head and a time of transmitting the synchronization signal by the cluster head; and
calculating, by the UE, a distance between the UE and the counterpart UE based on a difference between the second sum value and the first sum value.

2. The method of claim 1, further comprising:
transmitting, by the UE to the counterpart UE, the information on the first difference value.

3. The method of claim 1, further comprising:
transmitting, by the UE to the counterpart UE, the second discovery signal when a prescribed time unit elapses after the synchronization signal is received from a cluster head.

4. The method of claim 1, wherein the first discovery signal is transmitted by the counterpart UE when a prescribed time unit elapses after the counterpart UE receives the synchronization signal from the cluster head.

5. A user equipment (UE) for performing device-to-device (D2D) communication in a wireless communication system, the UE comprising:
a transceiver configured to transceive a signal with a counterpart UE of the D2D communication; and
a processor configured to process the signal, wherein the processor is configured to:
control the transceiver to receive a synchronization signal from a cluster head and receive a first discovery signal from the counterpart UE,
calculate a first difference value between a time of receiving the first discovery signal and a time of receiving the synchronization signal,
control the transceiver to receive information on a second difference value between a time of receiving a second discovery signal, which is transmitted by the UE, received by the counterpart UE and a time of receiving the synchronization signal received by the counterpart UE,
calculate a first sum value of the first difference value and the second difference value,
control the transceiver to receive, from the cluster head, information on a second sum value of a third difference value between a time of receiving the first discovery signal by the cluster head and a time of transmitting the synchronization signal by the cluster head and a forth difference value between a time of receiving the second discovery signal by the cluster head and a time of transmitting the synchronization signal by the cluster head, and
calculate a distance between the UE and the counterpart UE based on a difference between the second sum value and the first sum value.

6. The UE of claim 5, wherein the processor is further configured to:
control the transceiver to transmit the information on the first difference value to the counterpart UE.

7. The UE of claim 5, wherein the processor is further configured to:
control the transceiver to transmit, to the counterpart UE, the second discovery signal when a prescribed time unit elapses after the synchronization signal is received from a cluster head.

8. The UE of claim 5, wherein the first discovery signal is transmitted by the counterpart UE when a prescribed time unit elapses after the counterpart UE receives the synchronization signal from the cluster head.

* * * * *